United States Patent [19]

Barnwell et al.

[11] Patent Number: 4,467,052
[45] Date of Patent: Aug. 21, 1984

[54] TRAY FOR PACKAGING FOOD PRODUCTS

[75] Inventors: Robert Barnwell, Pittsburg; David R. Frye, Longview, both of Tex.

[73] Assignee: Plasti-Pak, Pittsburg, Tex.

[21] Appl. No.: 359,252

[22] Filed: Mar. 18, 1982

[51] Int. Cl.³ .................................................. C08J 9/08
[52] U.S. Cl. ........................................ 521/92; 264/54; 521/79; 521/97; 521/139; 521/908
[58] Field of Search .................. 521/139, 79, 908, 92, 521/97

[56] References Cited

U.S. PATENT DOCUMENTS

| | | | |
|---|---|---|---|
| 2,927,904 | 3/1960 | Cooper | 521/139 |
| 2,941,964 | 6/1960 | Houston et al. | 521/79 |
| 3,294,868 | 12/1966 | Pritchard | 521/139 |
| 3,351,569 | 11/1967 | Revallier et al. | 521/908 |
| 3,385,804 | 5/1968 | Hill, Jr. | 521/79 |
| 3,511,787 | 5/1970 | Bertorelli et al. | 521/908 |
| 3,962,154 | 6/1976 | Elgi | 521/139 |
| 4,029,612 | 6/1977 | Collington | 521/79 |
| 4,098,941 | 7/1978 | Johnson | 521/79 |
| 4,168,341 | 9/1979 | Siedenstrang et al. | 521/139 |
| 4,205,114 | 5/1980 | Canterino et al. | 521/79 |

Primary Examiner—Morton Foelak
Attorney, Agent, or Firm—Arnold, White & Durkee

[57] ABSTRACT

A plastic tray for packaging food products is disclosed. The tray has a preferred composition of about 85 percent polypropylene, 15 percent impact modifier or copolymer, 1 percent nucleating agent, and 1 percent density reduction agents.

A method of manufacturing a plastic tray of packaging food products is disclosed. The method includes the steps of mixing the polypropylene, impact modifier, nucleating agent and density reduction agents together, heating the mixture at 450° F. to 550° F. under a pressure of about 300 p.s.i., injecting the heated mixture into a mold, and cooling the mixture.

4 Claims, 3 Drawing Figures

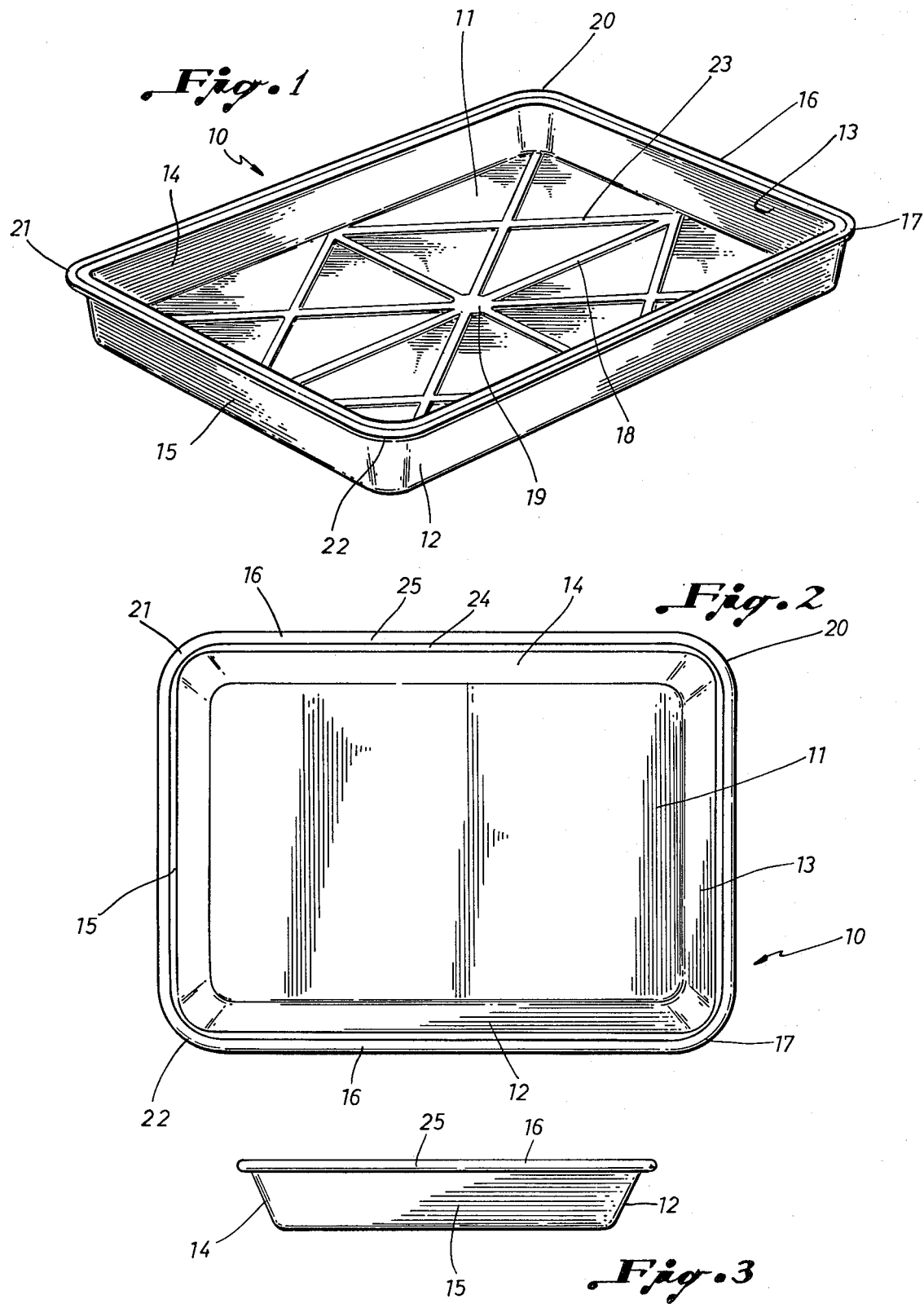

TRAY FOR PACKAGING FOOD PRODUCTS

BACKGROUND OF THE INVENTION

The material selected for a food packaging tray must be economical to produce. The cost of such a tray must not comprise a significant portion of the total cost of the packaged food product. Cost considerations place important constraints upon suitable materials which may be used for trays.

A suitable tray must also be durable and resistant to breakage. Meat products, and other food products, are typically subjected to rough handling during the course of their transportation from the packaging plant to the distributor, then to a retail outlet, and then to a consumer's home for final consumption. Several food packages are typically bound together in a single box, because it would be too slow and inconvenient to handle each package individually. The relatively heavy weight of such boxes sometimes results in a requirement that the boxes be handled by machinery. If such boxes are handled manually, they are often dropped or thrown. Successful testing of a packaging tray requires testing in the field by subjecting the tray to actual handling conditions through a normal distribution route to test the surviability of the tray. A suitable tray must be able to survive such handling.

In the past, Styrofoam has been used for trays. Styrofoam has proven to be less than completely satisfactory because of its brittleness and susceptibility to breakage. Some food products, especially meat, are relatively heavy and require additional strength from a packaging tray, which may not be available with Styrofoam.

In the past, cardboard has been used for trays. A suitable tray must be able to survive for the relatively long period of time that may elapse between packaging and final consumption of the food products. The juices from many foods, especially meat, commonly saturate a cardboard tray. The strength of the cardboard tray quickly deteriorates when the material is saturated. For this reason, cardboard is less than satisfactory as a tray material.

A suitable tray must be designed so that it can accept a cellophane wrapping around the tray and the food. It is important that the tray be designed so that it will not tear the cellophane wrapping during extensive handling and transportation. To prevent tearing of the cellophone, the design of the corners of the tray can be critical.

While strength must be maintained in a tray, the tray must also be flexible. Lack of flexibility can present problems in sealing the cellophane film on the bottom of the tray.

A food tray must be manufactured from materials which may maintain direct contact with the food substance without adverse health affects, or adverse effects on the taste and odor of the food. The material must be noncontaminating, even after prolonged contact with the food or meat which is packaged. The material must maintain its strength even in a deep chill environment. The material must have a low thermal coefficient to reduce the amount of energy required to lower the temperature of the tray itself when chilling the food product. The tray material should preferably be suitable for use in a microwave oven environment.

The weight of the tray is also an important factor. The weight of the tray adds to the weight of the food product which must be shipped after the product has been packaged. For a tray that weighs one ounce more than others, use of the tray could result in approximately 1,000 pounds additional weight per truckload of meat, assuming a typical truckload comprising 16,000 trays and a 36,000 pound load. The weight of the trays must be minimized, as the additional weight increases the transportation costs for transporting the packaged food product.

Impact polypropylene materials have been available, but have not had the impact strength required, or else lack the molding characteristics needed to produce a flat tray. The materials used for a food tray must not contribute any undesirable odor or taste to the food product. Conventional plastics typically have one or both of these disadvantages.

Efforts in the past to achieve a tray for packaging food products, especially meat, which has all of the characteristics of high strength, low weight, low temperature coefficient, adequate molding characteristics to produce a flat tray, and low microwave absorption, while still remaining within cost constraints, have not been altogether satisfactory. The problems enumerated above are not intended to be exhaustive, but are illustrative of problems in the prior art which are addressed by the present invention.

SUMMARY OF THE INVENTION

This invention features a composition of a preferred plastic tray for packaging meat products and other food products which is made from an optimum combination of components. The tray is made from a preferred combination of about 85% polypropylene, about 15% impact modifier, such as styrene-butadiene, about 0.1% nucleating agent, such as a mixture of silicon dioxide and aluminum oxide, and about 0.1% density reduction agents, such as a mixture of anhydrous citric acid and sodium carbonate. Pigment for coloration may also be added for appearances. The disclosed tray has the features of strength while maintaining flexibility, low weight, cost effectiveness, low microwave absorption, satisfactory thermal coefficients, and can be injection molded into a design which has satisfactory performance characteristics.

The invention also features of method of manufacturing the tray. Other features of the present invention will become apparent from the detailed description below.

BRIEF DESCRIPTION OF THE DRAWINGS

FIG. 1 is a perspective view of a tray made in accordance with the present invention.

FIG. 2 is a top view illustrating the tray of FIG. 1.

FIG. 3 is a side view showing the tray illustrated in FIGS. 1 and 2.

DETAILED DESCRIPTION OF A PREFERRED EMBODIMENT

A tray manufactured in accordance with the present invention is formed from a combination of polypropylene, a block copolymer, and a nucleating agent. The tray is manufactured by heating together the components and injection molding the resultant melted mixture into a plastic tray. Density reduction agents and pigment for coloration may also be added.

A polypropylene having a melt flow rate of 25 to 35 grams per ten minutes should preferably be used. Higher flow rates of up to 75 grams per ten minutes may also be used with satisfactory results. The polypropylene preferably comprises 85% of the tray, but may vary between 82% to 88%. The polypropylene provides a base material for the plastic tray. Suitable polypropylenes include Tenite polypropylene P7673-648G, manufactured by Eastman Chemical, Profax polypropylene PD-701, manufactured by Hercules, or Exxon polypropylene CD-610G manufactured by Exxon. Polypropylenes having a melt flow rate less than 12 grams per ten minutes, such as conventional polypropylenes, do not have the molding characteristics necessary to produce a flat tray.

An impact modifier is added to provide toughness in the tray. The impact modifier may be a block copolymer, and is preferably styrene-butadiene. The impact modifier preferably comprises 15% of the tray, but may vary between 12 and 18%. The impact modifier may also be butyl-polymer. Suitable impact modifiers include Exxon Butyl 077 elastomer, manufactured by Exxon, Kraton 2103 styrene-block copolymer, manufactured by Shell, or Profax 8523 polypropylene copolymer, manufactured by Hercules. Kraton 2103 styrene-block copolymer is composed of 28% styrene and 72% butadiene.

A nucleating agent is added to the mixture prior to heating. The nucleating agent provides particles which act as a seed or catalyst to enhance crystal formation when the plastic is heated and injection molded. The nucleating agent permits crystallization to occur at a lower temperature and at a faster rate than would otherwise be the case. The nucleating agent preferably has 90% of its particles in a range of size between 12 and 50 microns in diameter. A substantial number of particles less than 50 microns should be provided by the nucleating agent. If the particles are too large, weak spots may occur in the plastic.

The nucleating agent preferably comprises 0.1% of the tray, but up to 20% may be used with satisfactory results. The nucleating agent also functions to help insure that the tray that is produced is flat.

The nucleating agent preferably comprises a mixture of silicon dioxide and aluminum oxide. A suitable nucleating agent is manufactured by Pfizer under the trademark Microtalc MP12-50. Microtalc has a typical chemical composition of 61.3% silicon dioxide, 1.5% aluminum oxide, 31.1% magnesium oxide, 0.2% calcium oxide, 0.9% ferric oxide, and 0.5% acid solubles ($C_2O$—max). At the temperatures involved in heating the plastic, the nucleating agent should not melt, but should remain in the mixture as a dispersion of solid particles. Silicon dioxide and aluminum oxide are preferred because they are cost effective, do not add color or odor to the tray, and meet FDA requirements for food contact containers. Other suitable nucleating agents may include diatomaceous earth and calcium carbonate.

Density reduction agents are also preferably used in the tray. Such agents provide density reduction by making the tray lighter and permit the tray to be manufactured utilizing less material, yet having the same general properties. The density reduction agents preferably comprise 0.1% of the tray. Density reduction agents comprising up to 5% of the tray may be utilized without adverse effects.

Suitable density reduction agents include anhydrous granular citric acid and soda ash or sodium carbonate. The density reduction achieved by the density reduction agents makes the tray more economical. The density reduction agents are added prior to melting the mixture in a molding machine. The citric acid and soda ash are believed to react to form small gas bubbles in the plastic.

Pigments may be added to color the tray, if desired to make the appearance of the tray more pleasing. Suitable pigments include heavy metal free yellow pigments, such as that manufactured by PMS, Consolidated, or titanium dioxide, such as that manufactured by PMS, Consolidated. The pigment must preferably be suitable for use in a container that comes into direct contact with food. The pigment should not add any undesirable odor or taste to the tray.

In manufacturing a plastic tray in accordance with the present invention, the preferred method involves mixing the polypropylene and impact modifier, such as a copolymer, together with a nucleating agent and sodium carbonate. Pigmentation is also added. Citric acid is added to the mixture just prior to heating. The mixture is then heated under pressure to melt the mixture. This heating is done while the citric acid and sodium carbonate are reacting. The reaction between the citric acid and sodium carbonate during melting functions to reduce the density of the resultant plastic.

The citric acid is preferably maintained in a separate feeder and is added just as the material enters a heated barrel. In a preferred embodiment, a screw which mates with a heated barrel is used. The screw moves down the barrel as the material inside the barrel is melted. A pressure of up to 300 $lb/in^2$ is preferably maintained on the material by the screw during melting. A melting temperature of 500° F. is preferred, while temperatures in the range of 450° F. to 550° F. may give satisfactory results. The precise temperature may depend upon the mold that is utilized. Temperatures below 450° F. have been found to result in trays that are not flat, while temperatures above about 550° F. have in practice resulted in degradation of the plastic.

The reaction of the citric acid and sodium carbonate produces gas which expands in small finely dispersed zones or "bubbles" in the polymer, thus resulting in density reduction of the plastic. This occurs most significantly in the thicker edge or rim of the tray.

The melted mixture is injected under pressure into a mold utilizing conventional injection molding techniques. A pressure preferably in the range of 20,000 $lb/in^2$ is maintained on the melted mixture during injection molding.

The plastic tray is preferably cooled about 5 seconds prior to removing the tray from the mold. The tray is then removed from the mold.

A tray 10 manufactured in accordance with the present invention is illustrated in FIG. 1. The tray comprises a flat bottom 11, sides 12, 13, 14 and 15, and a rim 16. The rim 16 forms a curved rim corner 17 at the point where side 13 meets side 12. Similar rim corners 20, 21, and 22 are also formed between sides 13 and 14, sides 14 and 15, and sides 15 and 12, respectively. The design of the corners 17, 20, 21 and 22 is important to prevent tearing of a wrapping placed over the tray.

In a preferred embodiment, the bottom 11 has radial flow lines 18 extending from the center 19 of the bottom 11 to the sides 12, 13, 14 and 15 and to the rim corners 11, 20, 21 and 22. Transverse flow lines 23 extending between the sides at the point where the radial flow lines meet the sides are also preferably provided. The transverse flow lines 23 and the radial flow lines 18 form an "X" pattern where they meet in the four quadrants of the bottom 11.

In a preferred embodiment, the rim 16 includes a ledge 24 extending from the sides at an angle substantially parallel to the bottom 11. The ledge 24 is preferably about the same thickness as the side walls 12, 13, 14 and 15. The rim 16 also includes an expanded lip 25 extending around the perimeter of the tray 10, as shown in FIG. 2.

The radius of the corners 17, 20, 21 and 22 is important. Referring to the corner 17, shown in FIG. 2, if the corner 17 is too sharp, cellophane placed over the tray and food held therein will tear during handling. The radius of the corner 17 must be sufficiently curved so that it will not unduly stress the cellophane stretched over the tray. At the corner 17, the lip 25 is closer to the nearest edge of the bottom 11 than is the case at the center of the side 12, when viewed from above as in FIG. 2. The radius "R" of the corner 17 shown in FIG. 2 is generally equal to one inch. The corners 20, 21 and 22 are similarly constructed.

SUMMARY OF ADVANTAGES OF THE INVENTION

In constructing a plastic tray in accordance with the present invention, the advantages of high impact resistance combined with flatness of the tray are achieved. Prior art materials having flow rates of less than 12 grams per 10 minutes are unsatisfactory in this application because such materials result in warped trays. Other materials which may produce sufficiently flat trays do not have satisfactory impact resistance. The present invention has the advantage of providing molding characteristics needed to produce a flat tray while maintaining impact resistance resulting in low breakage of the trays during wrapping and handling. The present invention has the advantage of achieving these objectives within the cost constraints that are placed upon such a packaging application.

The present invention also provides the advantages of having minimal chemical off favor and low weight. A tray manufactured in accordance with the present invention has low microwave absorption, and produces no adverse melting or flavor differences when utilized in a microwave oven. A tray manufactured in accordance with the present invention is suitable for deep chill applications and has low thermal capacity, thus reducing the energy requirements for chilling food packaged in such trays.

The present invention offers the advantage of providing the ability to prepad trays, thus resulting in time savings during packaging. The present invention has the advantage of low average drip. The invention may be manufactured using injection molding techniques.

The above description is to be understood as a description of a presently preferred embodiment of the invention. Those skilled in the art will appreciate that the invention can include other embodiments. After having the benefit of the above disclosure, various modifications and substitutions of equivalent materials will be apparent to those skilled in the art. The above description of a presently preferred embodiment is given to illustrate the invention and should not be construed as limiting the invention.

What is claimed is:

1. An injection moldable plastic tray composition for packaging meat products and having satisfactory resistance to breakage in a food processing application, comprising in a blended combination:
   a polypropylene having a melt flow rate of 25 to 35 grams per ten minutes to provide a base material for a plastic tray, where the polypropylene comprises about 85 percent of the tray;
   a styrene-butadiene copolymer impact modifier to provide toughness in the tray, where the styrene-butadiene copolymer comprises about 15 percent of the tray;
   a nucleating agent including a mixture of silicon dioxide and aluminum oxide to promote crystal formation during manufacture of the tray and to promote flatness of the tray, where the nucleating agent comprises less than 1 percent of the tray; and,
   density reduction agents including a mixture of anhydrous citric acid and sodium carbonate, where the density reduction agents comprise less than 1 percent of the tray.

2. A plastic tray for packaging food products, comprising:
   a polypropylene having a melt flow rate of 25 to 35 grams per ten minutes to provide a base material for a plastic tray, where the polypropylene comprises 82 to 88 percent of the tray;
   an impact modifier to provide toughness, where the impact modifier comprises 12 to 18 percent of the tray;
   a mucleating agent including a mixture of silicon dioxide and aluminum oxide to promote crystal formation during manufacture of the tray, where the nucleating agent comprises up to 10 percent of the tray and,
   to provide density reduction of the tray, anhydrous citric acid comprises up to 2 percent of the tray and a material selected from the group consisting of soda ash and sodium carbonate where said material comprises up to 2 percent of the tray.

3. The tray according to claim 2, wherein:
   the impact modifier comprises a styrene-butadiene block copolymer.

4. The tray according to claim 2, wherein:
   the impact modifier comprises a butyl-polymer.

* * * * *

UNITED STATES PATENT AND TRADEMARK OFFICE
CERTIFICATE OF CORRECTION

PATENT NO. : 4,467,052
DATED : August 21, 1984
INVENTOR(S) : Robert Barnwell and David R. Frye It is certified that error appears in the above-identified patent and that said Letters Patent is hereby corrected as shown below:

Column 3, line 7, "CD-610G" should be changed to -- CD-610 --.

Claim 2, column 6, line 40, "mucleating" should be changed to -- nucleating --.

Signed and Sealed this

Twenty-sixth Day of March 1985

[SEAL]

Attest:

DONALD J. QUIGG

Attesting Officer    Acting Commissioner of Patents and Trademarks